United States Patent [19]
Karnowski

[11] Patent Number: 5,825,648
[45] Date of Patent: Oct. 20, 1998

[54] BACKUP SYSTEM FOR A TIME OF DAY CLOCK IN AN ELECTRONIC DEVICE

[75] Inventor: Mark J. Karnowski, Huntington Beach, Calif.

[73] Assignee: Casio PhoneMate, Inc., Torrance, Calif.

[21] Appl. No.: 622,656

[22] Filed: Mar. 26, 1996

[51] Int. Cl.⁶ .................................................. G05B 9/02
[52] U.S. Cl. ........................ 364/187; 364/143; 364/145; 364/569; 395/182.12; 395/750.12; 395/750.3; 395/750.5; 395/750.6; 395/750.8
[58] Field of Search .................................. 364/187, 569, 364/145, 143; 395/182.12, 750.05, 552, 750.04, 750.3, 750.5, 750.6, 750.8; 361/15; 320/2; 323/222; 340/825.31; 307/31; 342/76.66; 399/37; 365/229; 324/143; 348/13, 5; 371/61, 62

[56] References Cited

U.S. PATENT DOCUMENTS

| | | | |
|---|---|---|---|
| 3,729,676 | 4/1973 | Currie et al. | 342/76.66 |
| 4,466,074 | 8/1984 | Jindrick | 364/569 |
| 4,495,596 | 1/1985 | Sciulli | 395/182.12 |
| 4,539,632 | 9/1985 | Hansen et al. | 364/143 |
| 4,570,219 | 2/1986 | Shibukawa | 395/552 |
| 4,580,248 | 4/1986 | Imaizumi | 365/229 |
| 4,633,361 | 12/1986 | Ella et al. | 361/145 |
| 4,783,755 | 11/1988 | Blanchard et al. | 364/569 |
| 4,905,187 | 2/1990 | Beyers, Jr. | 395/750.2 |
| 5,148,686 | 9/1992 | You | 62/234 |
| 5,216,357 | 6/1993 | Coppola et al. | 324/142 |
| 5,254,888 | 10/1993 | Lee et al. | 327/298 |
| 5,428,790 | 6/1995 | Harper et al. | 395/750.04 |
| 5,500,721 | 3/1996 | Randall et al. | 399/37 |

*Primary Examiner*—Reba I. Elmore
*Assistant Examiner*—McDievnel Marc
*Attorney, Agent, or Firm*—Frishauf, Holtz, Goodman, Langer & Chick

[57] ABSTRACT

A backup system for a time of day clock in an electronic device that enables a microprocessor to accurately maintain the time of day clock in the event of a power interruption. The backup system can be used with any AC powered electronic device that maintains a clock. The backup system allows a capacitor to supply backup power to the microprocessor and insures the accuracy of the clock by accounting for component tolerances in the system. The backup system calibrates the time constant of an RC circuit connected to the microprocessor while AC power is still available and stores that value for later use in determining the length of a power interruption. The calibration process allows the system to use lower cost components with higher tolerance values without compromising the accuracy of the time of day clock.

33 Claims, 13 Drawing Sheets

BACKUP SYSTEM FOR A TIME OF DAY CLOCK IN AN ELECTRONIC DEVICE

BACKGROUND OF THE INVENTION

This invention relates to the backup of a time of day clock in an electronic device and the updating of the same after a power interruption, and more particularly to the backup and update of a time of day clock contained in an AC powered device that maintains a clock, such as a telephone answering machine, VCR, clock radio, electronic sprinkler system and the like.

Many AC powered electronic devices use a microprocessor to maintain the operation of a time of day clock. Using its time base, or perhaps the 60 Hz AC frequency, the microprocessor uses internal counters to maintain the current day, hour, minute and second. As a result of this counter activity, the microprocessor must have a supply of power in order to maintain the clock.

When a traditional AC powered electronic device encounters an AC power interruption, the clock will not continue to function because the microprocessor is no longer receiving the power it needs to execute the time of day clock operation. This is unsatisfactory because it is important for many electronic devices to maintain the current time during a power interruption. In an executing mode (i.e., in order to maintain the time of day clock), the microprocessor draws power. If the power draw is excessive, batteries are relied upon to maintain the operation of the clock during the power interruption. This results in a serious drawback in consumer electronic devices because consumers cannot be relied upon to install backup batteries and even then, they do not usually replace the batteries before the energy reserve is completely depleted. Therefore, it is desirable to provide a simple, cost effective device to backup a time of day clock in the event of a power interruption.

One approach has been to slow down the operation of the microprocessor so as to reduce its power consumption. Since most consumer electronic devices use CMOS microprocessors whose power consumption is directly proportional to the frequency of operation, slowing down the microprocessor reduces the current draw. If the microprocessor is sufficiently slowed, the current draw can be lowered enough to allow a simple capacitor-based power supply to provide a temporary supply of power during a power interruption. Unfortunately, not all microprocessors have the capability to reduce their clock speed. Additionally, even at slow speeds, the microprocessors current draw is large enough to require large, expensive capacitors (commonly called 'super caps') to supply the power for the backup function.

Another approach is disclosed in U.S. Pat. No. 4,783,755 to Blanchard et al. Blanchard et al. discloses an interval timer circuit that can be employed to determine the downtime of electronic equipment. The interval timer circuit includes a resistor-capacitor (RC) circuit coupled to a reference voltage source. Blanchard et al. discloses calibrating the system during an initialization period by removing power from the RC circuit, measuring the voltage as it decays at predetermined time intervals and storing each measured voltage value in a register along with its associated time. This information is then used to determine the length of the power interruption. During a power interruption, the capacitor discharges. Upon restoration of power, the microprocessor measures the voltage across the RC circuit and locates the measured voltage in the register to associate a corresponding time. The time read from the register indicates the length of the power interruption. The accuracy of the system disclosed by Blanchard et al. is directly dependent on how much memory is used to store calibration data. Obviously, the smaller the time interval the more memory used, and therefore the more accurate the system. However, a drawback to this device is that when more memory is used, the system becomes more expensive. If consumer electronic devices were built based on the teaching of Blanchard et al., a trade-off would have to be made between clock accuracy and cost. Alternatively, the same amount of memory could be used but a reduced amount of memory could be allocated to other system functions. A further drawback to Blanchard et al. is that the reference does not disclose how the voltage/time data is to be interpolated. That is, it is not clear how Blanchard et al. determines the duration of a power interruption based on the voltage read out.

Still another approach is disclosed in U.S. Pat. No. 4,466,074 to Jindrick et al. Jindrick et al. discloses a power interruption timer which, when the supply of power is restored, generates a signal indicative of the duration of the interruption. The signal is provided to a microprocessor that updates the current time which is stored in a memory to reflect the correct time. Jindrick et al. operates on the principle that during a power interruption, a timing capacitor in an RC circuit will discharge in a predictable manner. When power is restored, the capacitor will recharge to its previous normal voltage. When the capacitor is fully recharged (i.e., reaches its normal value), a signal is sent to the microprocessor. The elapsed time between when power was restored and when the signal was received by the microprocessor is related to and indicative of the duration of the power interruption. Jindrick et al., however, is not able to calibrate the RC circuit. Therefore, the system's accuracy is determined by the accuracy of the components. Jindrick et al. also appears to require expensive, highly accurate components with low tolerances in order to provide an accurate real time value. Jindrick et al. even states that "although the timers do not have high accuracy, they are suitable for resolving a 15 minute period in power outages up to 6 hours". This is clearly not sufficient for most consumer electronic devices. Moreover, Jindrick et al. fails to disclose how the duration of a power interruption is actually calculated by the microprocessor.

Yet another approach is disclosed in U.S. Pat. No. 4,905,187 to Beyers, Jr. Beyers, Jr. discloses a time-keeping apparatus for maintaining time during an interruption of a primary power supply. During the power interruption a backup power supply is activated. Beyers, Jr. teaches a microprocessor having two operating modes: a normal mode and a standby mode. In the normal mode, the microprocessor provides normal computing and memory storage functions including time-keeping. In the standby mode, the contents of the memory are retained, but the clock is stopped and virtually all other functions of the microprocessor are disabled. According to Beyers, Jr., the duration of the standby mode is relatively long and the duration of the normal mode is relatively short. The microprocessor continuously cycles between the standby and normal modes during the power interruption and stores the number of times the cycle is performed along with the duration of the standby mode. Upon restoration of power, the microprocessor multiplies the number of cycles by the duration of the standby mode and adjusts the time of day by this amount. Beyers, Jr., however, does not measure the time it takes to switch between modes nor the duration of the normal mode. This results in inaccuracy when the time of day is updated by the microprocessor. In addition, Beyers, Jr. fails to disclose the exact nature of the backup power supply. It is most likely, however, that the back up power supply in Beyers, Jr. is a battery back up system because a simple, low-cost power supply backup system, such as a large capacitor, would not be able to handle the large, though momentary, current requirements of the normal mode. As discussed hereinabove, battery backup systems rely upon the user to install a backup battery, monitor the power reserve and install a replacement battery when necessary. Thus, these systems are not a desirable power supply backup for consumer electronic devices.

SUMMARY OF THE INVENTION

It is an object of the present invention to provide a low cost backup system for an electronic device time of day clock.

It is another object of the present invention to provide a backup system for an electronic device time of day clock that enables a microprocessor to accurately maintain the clock in the event of an interruption in the supply of power.

It is still another object of the present invention to provide a backup system for an electronic device time of day clock that enables a capacitor to supply backup power to the microprocessor in the event of a power interruption.

It is yet another object of the present invention to provide a backup system for an electronic device time of day clock that insures the accuracy of the clock by accounting for component tolerances in the system.

It is a further object of the present invention to provide a backup system for an electronic device time of day clock that enables the use of low cost components with larger value tolerances without compromising the accuracy of the clock.

It is still a further object of the present invention to provide a backup system for an electronic device time of day clock that requires only resistors, diodes and a capacitor.

It is still a further object of the present invention to provide a backup system for an electronic device time of day clock which overcomes inherent disadvantages of known time of day clock backup systems.

According to a first embodiment of the present invention, a backup system for an electronic device time of day clock comprises a resistor-capacitor circuit, a charging device for selectively supplying an electrical charge to the resistor-capacitor circuit, and a controller (microprocessor) having an analog/digital converter and a corresponding input port coupled to the resistor-capacitor (RC) circuit for measuring a voltage level of the resistor-capacitor circuit, and a digital output port. The RC circuit has a time constant of a longer duration than most typical power interruptions. The controller also includes means for determining the time constant of the resistor-capacitor circuit, and means for updating the time of day clock after a power interruption has occurred based on the RC time constant and a measured change in voltage of the RC circuit during the power interruption.

In operation, the digital output from the controller is normally set high to keep the RC circuit charged. When a power interruption occurs, the digital output is set low, and the capacitor of the RC circuit is allowed to discharge. At this point, the operation of the microprocessor is suspended, thereby drawing little current. When power is restored, the microprocessor reads the voltage level on the RC circuit, and calculates the duration of the power interruption. The microprocessor then adds the noted duration of the power inter-ruption to the time of day registered immediately prior to the power interruption.

According to a second embodiment of the present invention, a backup system for an electronic device time of day clock comprises a resistor-capacitor (RC) circuit, a charging device for selectively supplying an electrical charge to the RC circuit, and a controller (microprocessor) having a digital input port coupled to the RC circuit for sensing a digital voltage level of the RC circuit, and first and second digital output ports. The controller allows the RC circuit to discharge during a power interruption. When power is restored, the RC circuit is permitted to continue to discharge down to a threshold voltage. The controller measures the time required to discharge the RC circuit down to the threshold voltage after power is restored, calculates the duration of the power interruption based on the measured discharge time, and adds the calculated power interruption to the time of day clock to update the clock. The second digital output port controls a fast discharge circuit that speeds up the process.

In operation, the RC circuit of the second embodiment operates in the same way as in the first embodiment of the present invention until power is restored. While AC power is being supplied, both digital output ports are set high, but the second digital output port has no effect on the RC circuit because it back biases a diode. When a power failure occurs the first output port is set low to allow the RC circuit to discharge. When power is restored, the second digital output port is set low and a second resistor is switched in to reduce the time constant. The value of the second resistor is preferably much smaller than that of the resistor in the RC circuit. Therefore, the value of the second resistor will dominate the new time constant and cause the capacitor to discharge quickly. The microprocessor measures the interval required for the capacitor to discharge down to a threshold voltage, which is the voltage at which the digital input senses the circuit to be logically low. The duration of the power interruption can then be calculated by the microprocessor and added to the time of day registered before the power interruption occurred.

As a result of the present invention, time keeping accuracy is improved during a power interruption by accounting for component tolerances in the system. The microprocessor accomplishes this during a calibration mode by discharging the capacitor while power is available. By carefully measuring the discharge time while power is available, a more accurate value of the time constant (RC) can be calculated. This enables the system to maintain accuracy while still allowing the use of inexpensive components with larger value tolerances.

A preferred form of the backup system for an electronic device time of day clock, as well as other embodiments, objects, features and advantages of this invention, will be apparent from the following detailed description of illustrative embodiments thereof, which is to be read in connection with the accompanying drawings.

DETAILED DESCRIPTION

According to the present invention, a backup system for an electronic device time of day clock enables a microprocessor to cease operation during a primary power interruption. In the event of a power interruption, the microprocessor enters a "halt" mode in which it draws minimal power, yet maintains the contents of its RAM memory and the state of its input/output ports. This minimal power draw is small enough so that a capacitor backup system can be coupled to the microprocessor rather than a battery backup system. In the preferred embodiment of the invention, the electronic device normally operates on AC power.

Figure 1:
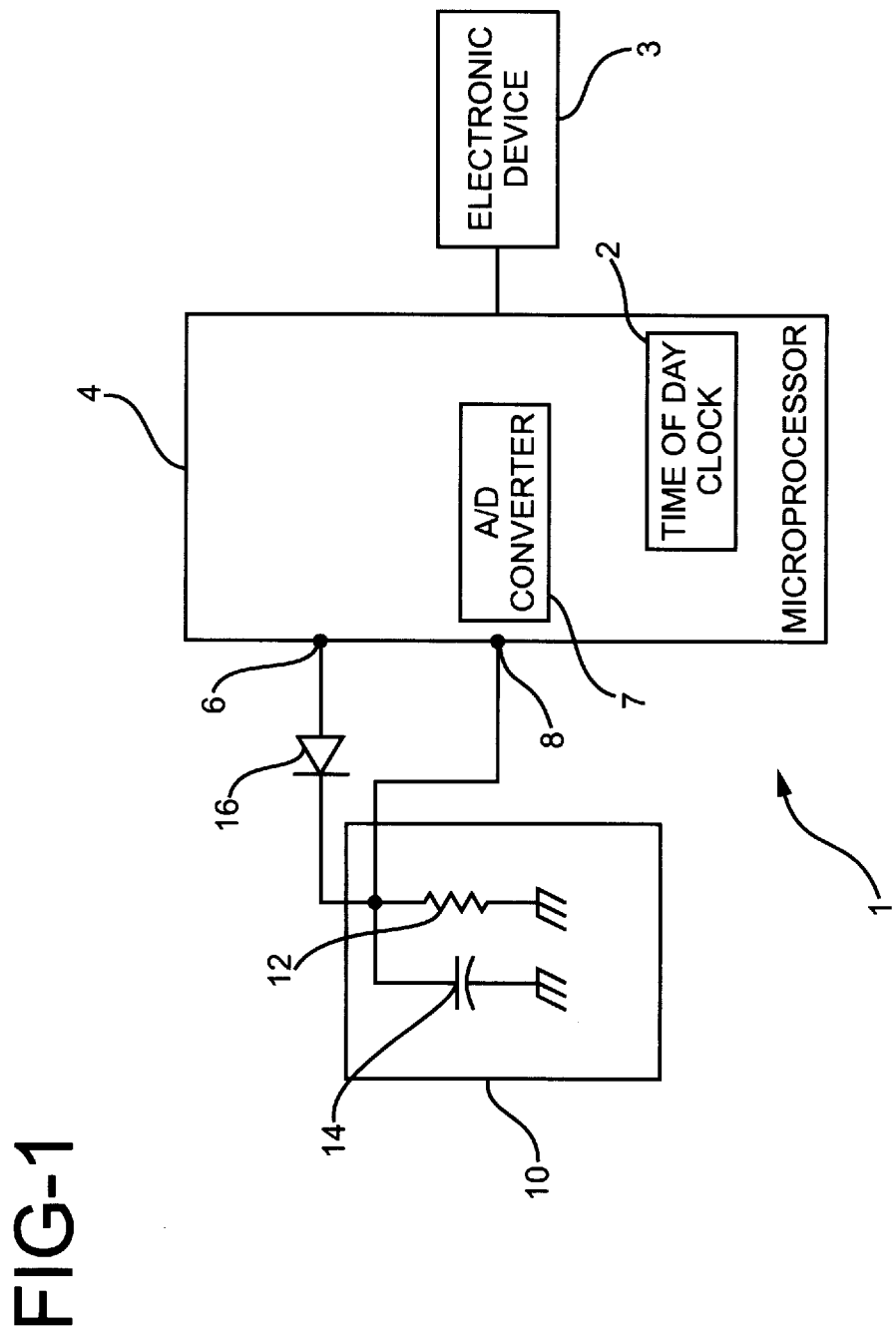
FIG. 1 is a block diagram of a backup system for an electronic device time of day clock in accordance with a first embodiment of the present invention.

Referring now to the drawings, and initially to FIG. 1 thereof, a backup system for an electronic device time of day clock 1 includes a microprocessor 4. The microprocessor 4 includes the time of day clock 2, a digital output port 6, analog-to-digital (A/D) converter 7 and an A/D converter input port 8. The A/D converter input port 8 is operatively coupled to resistor-capacitor (RC) circuit 10. The RC circuit 10 preferably has a time constant of a longer duration than typical power interruptions. The RC circuit 10 includes a resistor 12 and a capacitor 14 connected in parallel. During normal operation, the digital output port 6 is set high and a diode 16, coupled between the digital output port 6 and the RC circuit 10, electrically charges the capacitor 14. When a power interruption occurs, the digital output port 6 is set low and the capacitor 14 is allowed to discharge. At that point, the operation of the microprocessor 4 can be suspended, thereby drawing little current.

Figure 2:
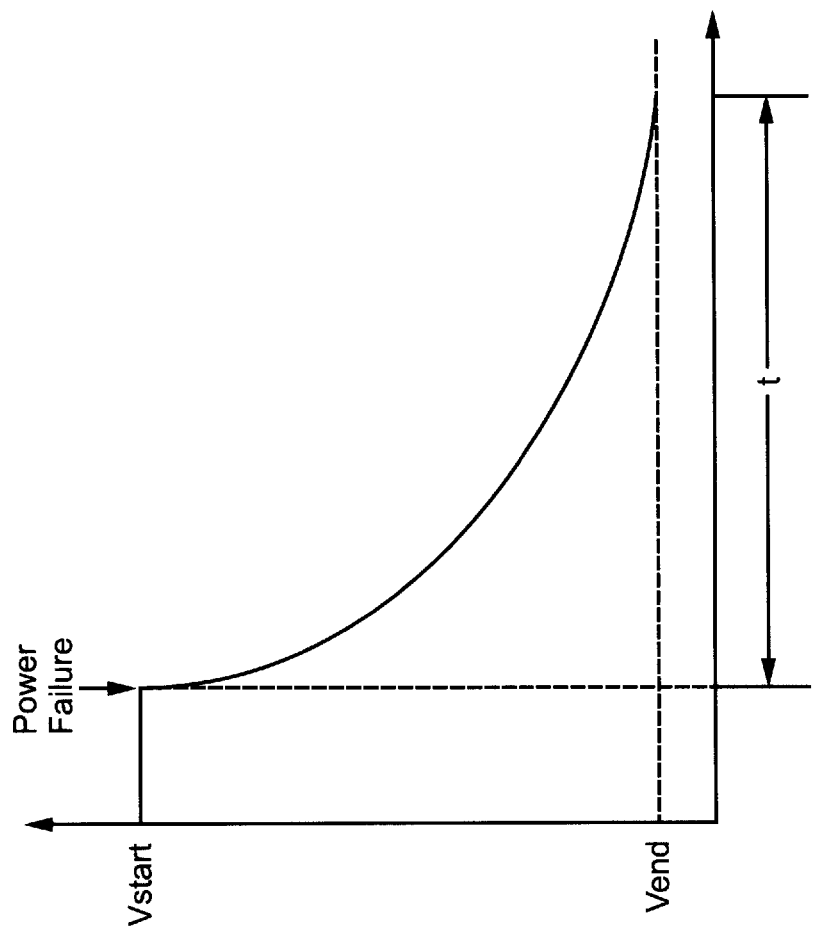
FIG. 2 is a graph showing the exponential decay of voltage over time from a capacitor in an RC circuit during a power interruption in accordance with the first embodiment of the present invention.

Referring now to FIG. 2 in conjunction with FIG. 1, during the power interruption, the capacitor 14 discharges exponentially over time (i.e., the voltage measured across capacitor 14 decays exponentially). When power is restored, the microprocessor 4 measures the voltage potential across the RC circuit 10 and calculates the duration of the power interruption according to the equation:

$$V_{end} = V_{start}(e^{-t/RC}),$$

where t is the time in seconds, $V_{start}$ is the measured voltage potential at the instant of power interruption and $V_{end}$ is the voltage potential measured at the instant of power restoration. If the value of the resistor 12 (R) and the value of the capacitor 14 ($C_1$) are known, and $V_{start}$ and $V_{end}$ are measured by the A/D converter 9, the duration of the power interruption (t) can be determined. The microprocessor 4 then updates the time of day clock 2 by adding the calculated duration of the power interruption (t) to the stored time of day immediately before the power interruption occurred.

Figure 3:
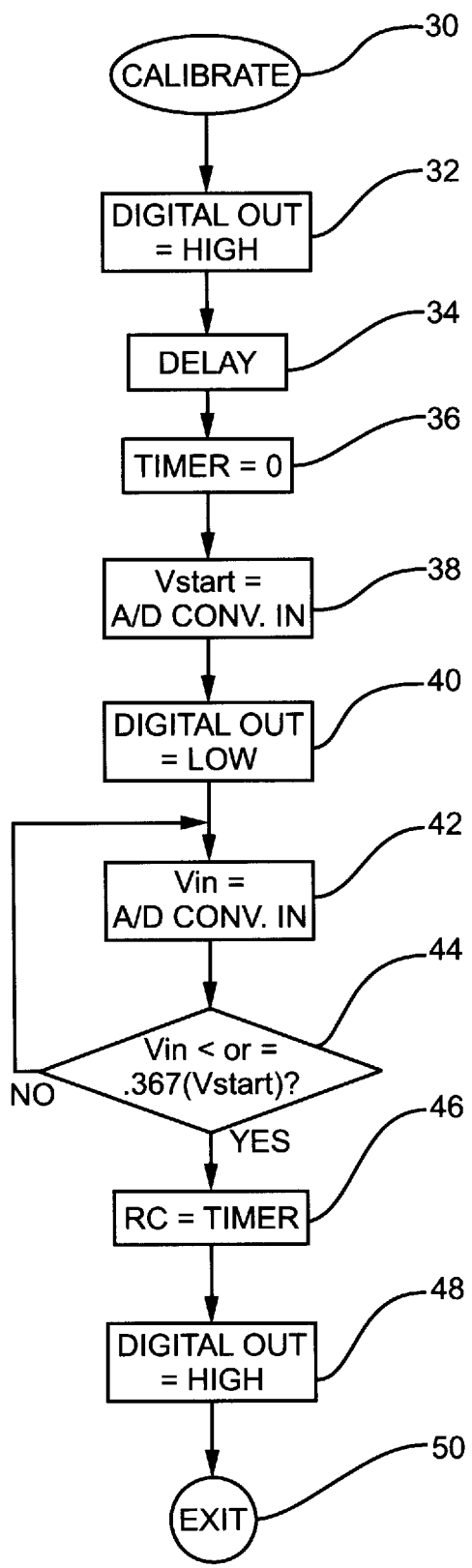
FIG. 3 is a flow diagram showing the calibration procedure method for calibrating the RC circuit in accordance with the first embodiment of the present invention.

FIG. 3 is a flow diagram showing the method used by the microprocessor 4 in the first embodiment (refer to FIG. 1) to calibrate the time constant of the RC circuit 10.

The present invention according to the first embodiment improves time keeping accuracy by accounting for component tolerances in the system. Using inexpensive components with large tolerance values can adversely affect the accuracy with which a microprocessor maintains the time of day clock. However, using components with small tolerance values is very expensive and adds cost to the end product. The calibration process of the present invention enables the use of low cost components with large tolerance values without compromising time-keeping accuracy. During the calibration process, the microprocessor discharges the capacitor while power is still available and measures the time it takes the capacitor to discharge to a predetermined level. This time is stored and used when a power interruption occurs to accurately determine the duration of the power interruption (refer to FIG. 5).

Upon starting the calibration process (step 30 of FIG. 3), the microprocessor 4 sets the digital output port high (step 32). Next, a delay is instituted to allow the capacitor of the RC circuit to charge up (step 34) and a timer is set to 0 (step 36). The microprocessor measures the voltage at the A/D converter input port 8 and stores that value as $V_{start}$ (step 38). The digital output port 6 is then set low which allows the capacitor to discharge (step 40). Next, the microprocessor 4 measures the voltage at the A/D converter input port 8 and stores the measured value as $V_{in}$ (step 42). The microprocessor then determines if $V_{in}$ is less than or equal to 0.367 times $V_{start}$ (step 44). If $V_{in}$ is greater than 0.367 times $V_{start}$ (NO in step 44), the microprocessor returns to step 42 where it again reads the voltage at the A/D converter input port 8 and stores that number as $V_{in}$. This procedure is repeated until $V_{in}$ is less than or equal to 0.367 times $V_{start}$ (yes in step 44). When $V_{in}$ less than or equal to 0.367 times $V_{start}$, t (the elapsed time on the timer) is equal to RC (the time constant of the RC circuit). According to the equation:

$V_{in} = e^{-t/RC}(V_{start})$, when $t$ equals $RC$, $V_{in} = (e^{-1})(V_{start})$.

Since $e^{-1}$ equals 0.367, it follows that $V_{in} = 0.367 (V_{start})$ when t equals RC. At this point, the timer is read and the microprocessor stores the elapsed time as RC (step 46). The variable RC is now the accurate time constant of the RC circuit and can be used to determine the duration of a power interruption should one occur (refer to FIG. 5). Finally, the digital output is reset to high (step 48) and the routine is terminated (step 50).

Figure 4:
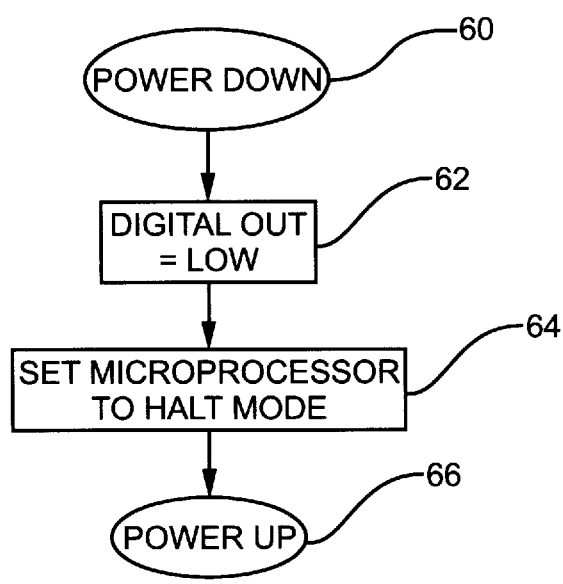
FIG. 4 is a flow diagram showing the power down procedure method for responding to a power interruption in accordance with the first embodiment of the present invention.

Referring now to FIG. 4, a flow diagram showing the method used by the microprocessor 4 in the first embodiment to respond to a power interruption is shown. After losing power (step 60), the microprocessor sets the digital output port 6 low, thus causing the capacitor 14 to discharge (step 62). The microprocessor 4 then enters a halt mode where it draws very little current from the capacitor 14 (step 64). Alternately, power can be removed from the microprocessor although this may require switching to isolate the microprocessor ports from the RC circuit. Once normal power is restored, the routine continues and proceeds to the power up routine (step 66).

Figure 5:
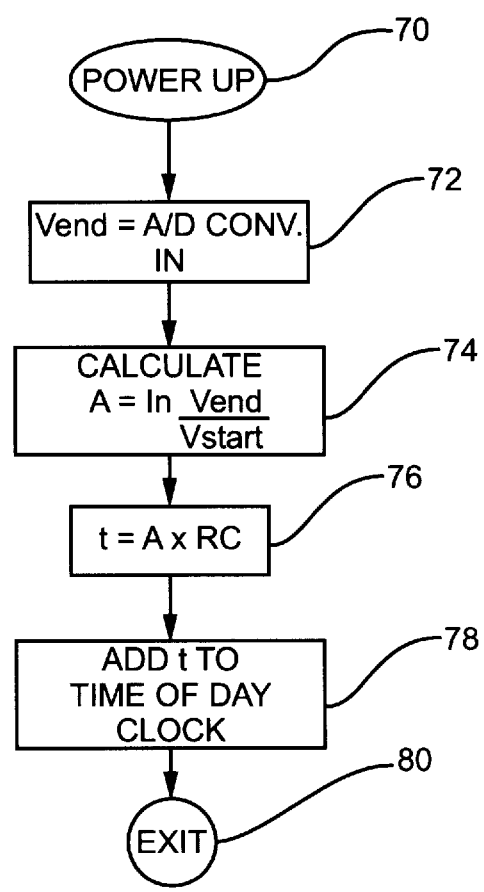
FIG. 5 is a flow diagram showing the power up procedure method for updating a time of day clock after power has been restored in accordance with the first embodiment of the present invention.

FIG. 5 is a flow diagram showing the method used by the microprocessor 4 in accordance with the first embodiment to accurately update the time of day clock when power is restored after a power interruption. When power is restored (step 70), the microprocessor 4 measures the voltage at the A/D converter input port 8 and stores that value as $V_{end}$ (step 72). In step 74, the microprocessor calculates a variable A according to the equation:

$$A = ln(V_{end}/V_{start}).$$

$V_{start}$ is the voltage to which the capacitor is charged prior to power interruption which can be measured during power on. Next, in step 76, the microprocessor determines the duration of the power interruption, t, by multiplying the variable A by the time constant RC (which was stored as a result of the calibration procedure described above with respect to FIG. 3). As known in the art, the microprocessor 4 then adds t (i.e., increments) to the time of day clock (step 78) and the routine is terminated (step 80).

Figure 6A:
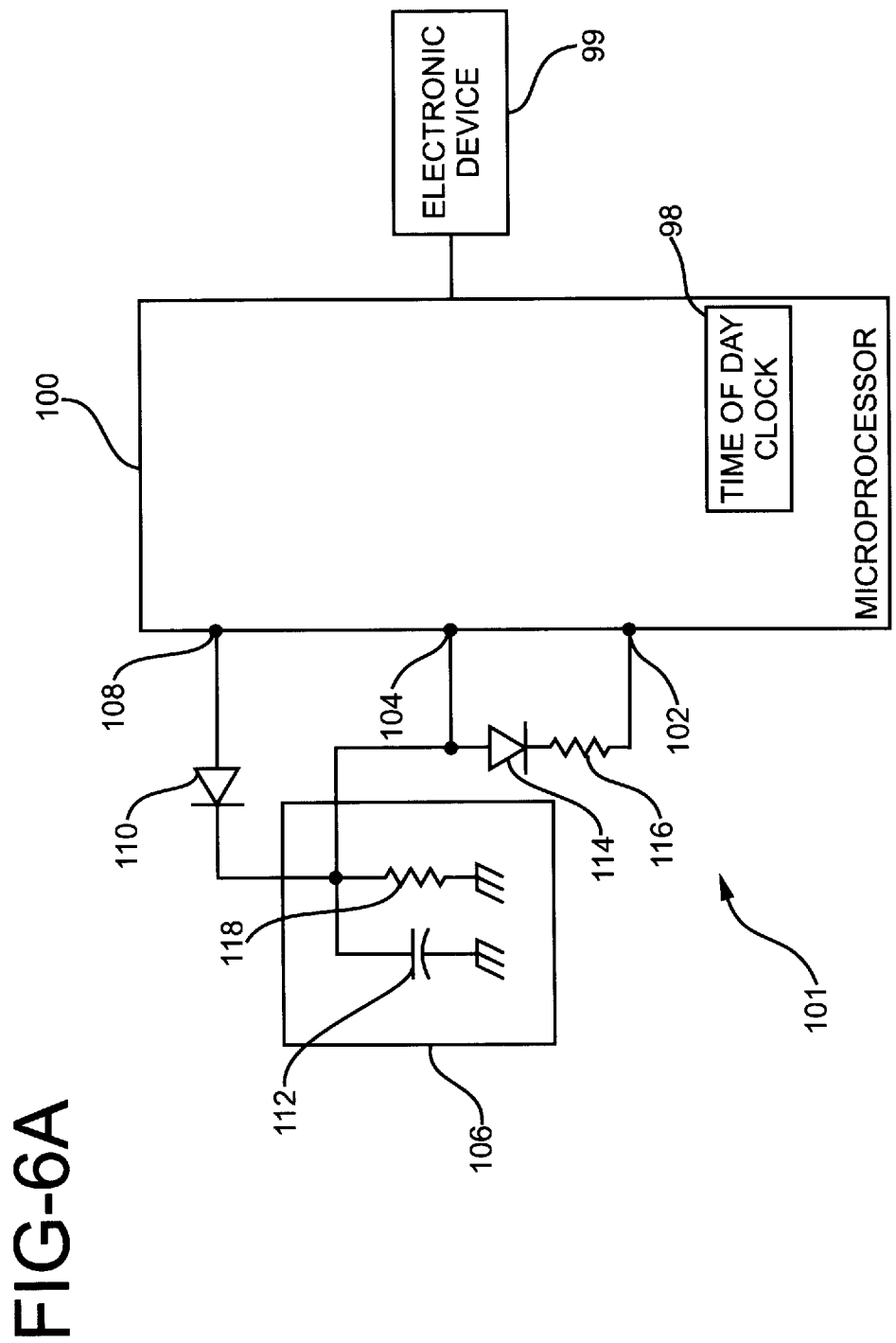
FIG. 6A is a block diagram of a backup system for an electronic device time of day clock in accordance with a second embodiment of the present invention.

Referring now to FIG. 6A, a second embodiment of a backup system for an electronic device time of day clock 101 includes a microprocessor 100. The microprocessor 100 includes the time of day clock 98, first and second digital output ports 108 and 102 respectively, and a digital input port 104 (instead of the A/D converter input 6 shown in FIG. 1). An RC circuit 106 having capacitor 112 and resistor 118 operates the same way as the RC circuit 8 discussed above with respect to FIG. 1 until power is restored. While power (in the preferred embodiment AC power) is being supplied, the first and second digital outputs ports (102 and 108) are set high. The first output port 108, operatively coupled by a first diode 110 to the RC circuit 106, electrically charges the capacitor 112. A second diode 114 and resistor 116 are coupled, in series, between the digital input port 104 and the second digital output port 102. When the second digital output port 102 is high, it has no effect on the RC circuit 106 because it back biases the second diode 114.

When a power interruption occurs, the first digital output port 108 is set low and the capacitor 112 is allowed to discharge. When power is restored, the second digital output port 102 is set low and the second resistor 116 is switched in. The value of the second resistor 116 is much smaller than that of resistor 118 in the RC circuit 106. Therefore, the value of the second resistor 116 will dominate the new time constant, and cause the capacitor 112 to discharge quickly (that is, the RC time constant will be reduced). The microprocessor 100 then measures the time required for the capacitor 112 to discharge down to the predetermined threshold voltage. The threshold voltage is the voltage where the digital input port 104 senses that the RC circuit is logically low. The microprocessor 100 uses this time measurement to calculate the duration of the power interruption (refer to the flow diagram in FIG. 10) and update the time of day clock 98.

Figure 6B:
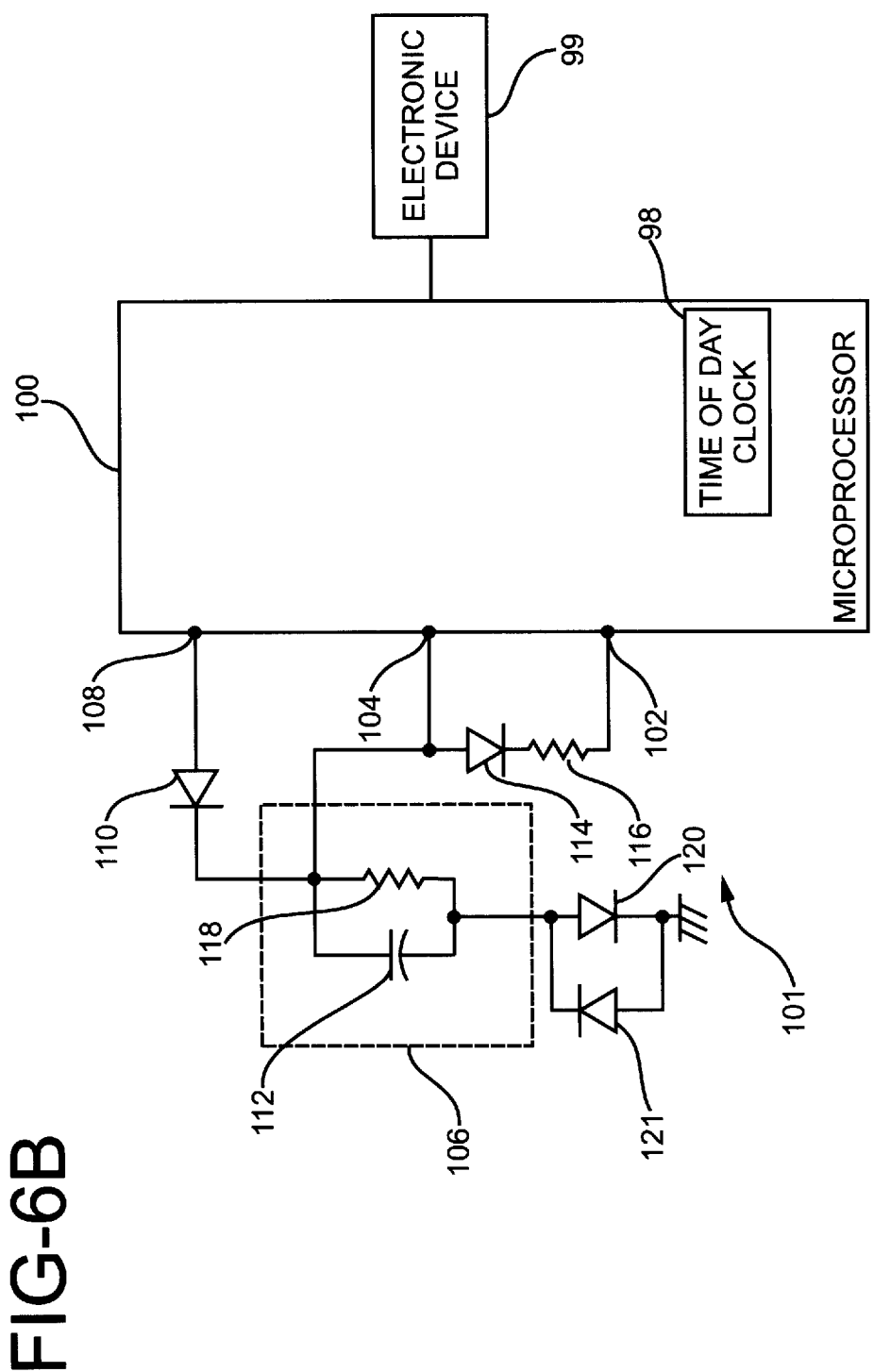
FIG. 6B is a block diagram of an alternative backup system for an electronic device time of day clock in accordance with the second embodiment of the present invention.

FIG. 6B shows an alternate embodiment of the circuit shown in FIG. 6A. In FIG. 6B, a third and fourth diode 120, 121 are coupled between the RC circuit 106 and ground to compensate for any error caused by the voltage drop of the second diode 114. The circuit in FIG. 6B operates the same way as discussed above with respect to the circuit shown in FIG. 6A.

Figure 7A:
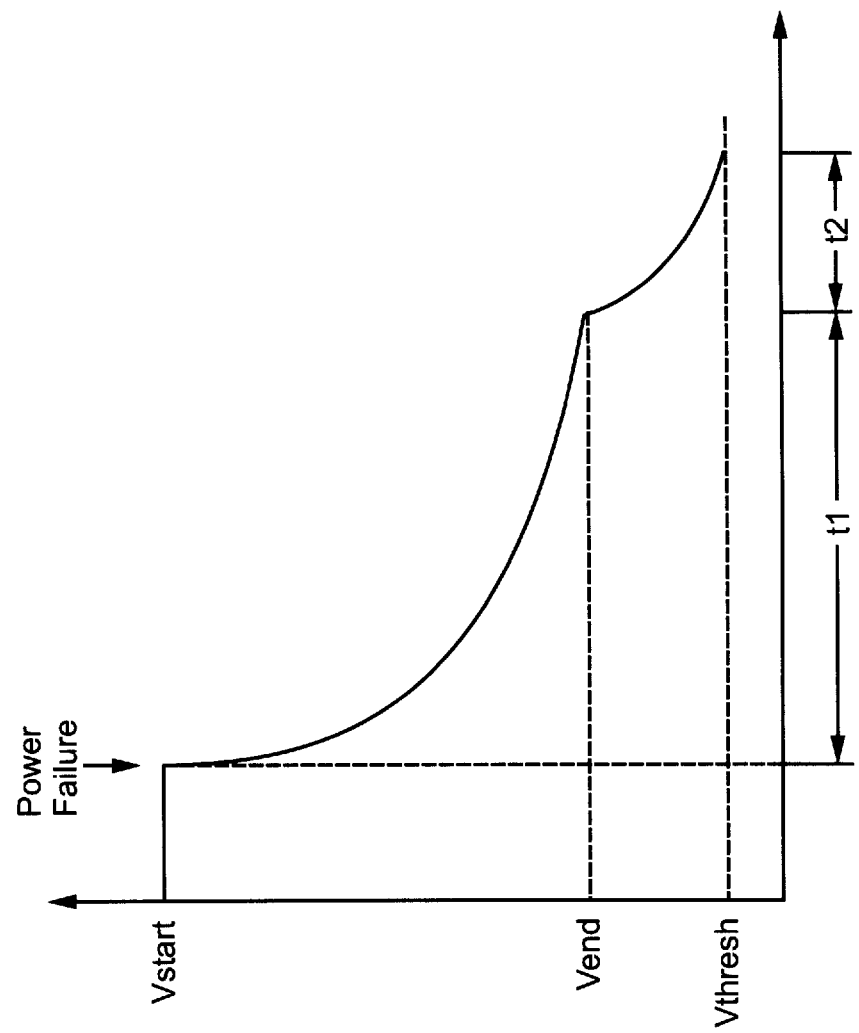
FIG. 7A is a graph showing the exponential decay of voltage over time from a capacitor in an RC circuit through a first resistor after a power interruption has occurred, and the exponential decay of voltage over time from the same capacitor through a second resistor after the second resistor is coupled thereto upon restoration of power, in accordance with the second embodiment of the present invention.

FIG. 7A graphically depicts the exponential decay of voltage from the capacitor 112 in the RC circuit 106 of FIGS. 6A and 6B during and after a power interruption. As discussed above with respect to FIG. 6A, when a power interruption occurs (corresponding to $V_{start}$), the first digital output port 108 is set low and the capacitor 112 is allowed to discharge. When power is restored (corresponding to $V_{end}$), the second digital output port 102 is set low and the second resistor 116 is switched in to reduce the RC time constant, causing the capacitor 112 to discharge quickly. The microprocessor 100 then measures time t2, which is the time required for the capacitor 112 to discharge down from $V_{end}$ to the threshold voltage ($V_{thresh}$). The duration of the power interruption t1, can be determined since t2 has been measured and the RC circuit 106 has been calibrated (that is the discharge times of the capacitor 112 had been calculated) while power was being supplied to the electronic device (refer to the discussion below and the flow diagrams in FIGS. 8 and 10). The microprocessor 100 can then update the time of day clock 98 by adding t1 to the time of day immediately before the power interruption.

Figure 7B:
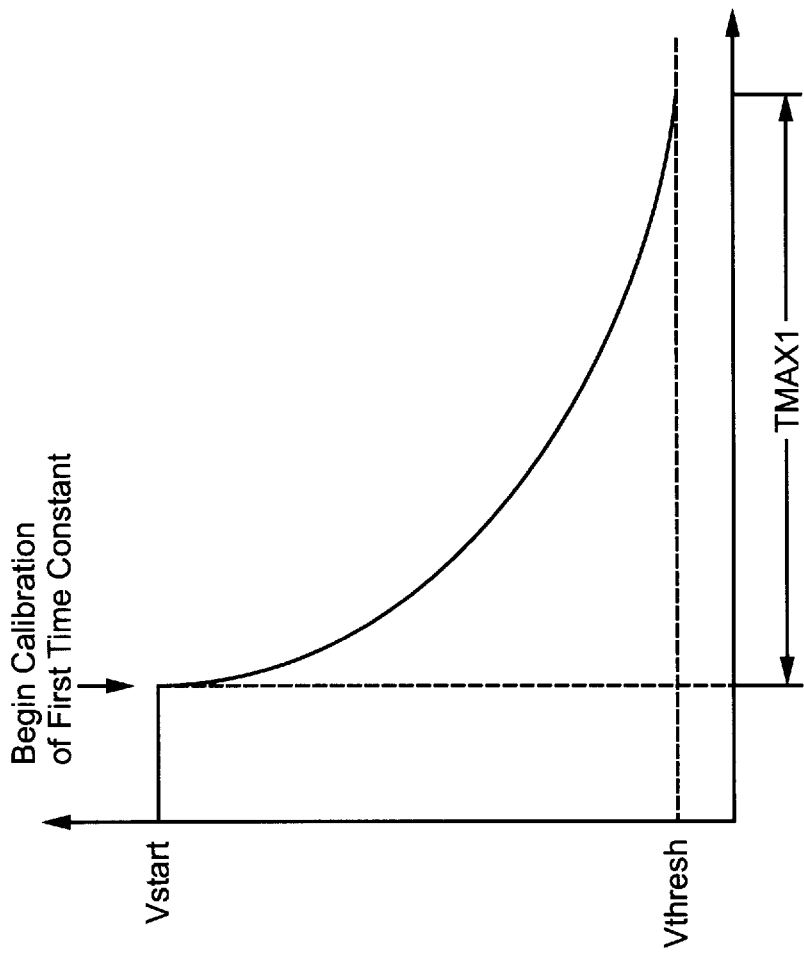
FIG. 7B is a graph showing the exponential decay of voltage over time from the capacitor in the RC circuit as the capacitor is allowed to discharge through the first resistor down to a predetermined threshold voltage for the purpose of calibrating a first discharge time in accordance with the second embodiment of the present invention (not to scale).
Figure 7C:
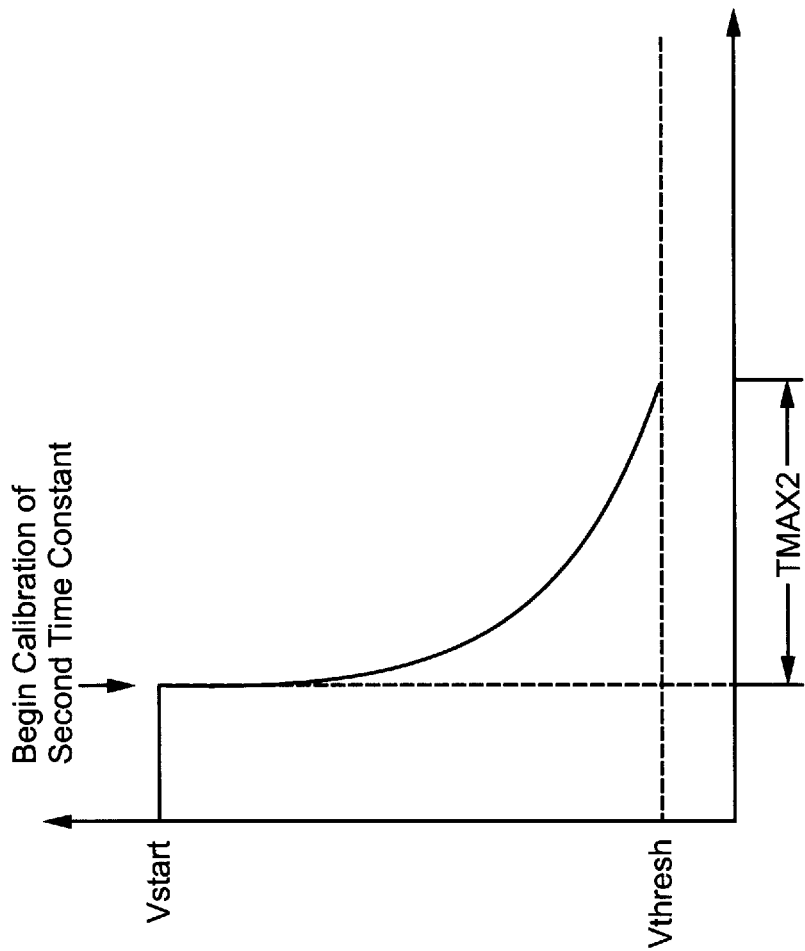
FIG. 7C is a graph showing the exponential decay of voltage over time from the capacitor in the RC circuit as the capacitor is allowed to discharge through the second resistor down to a predetermined threshold voltage for the purpose of calibrating a second discharge time in accordance with the second embodiment of the present invention (not to scale).

As compared to the first embodiment of the invention, the second embodiment does not utilize an A/D converter. Therefore, the voltage values of $V_{start}$, $V_{end}$ and $V_{thresh}$ cannot be directly measured and the discharge time of the capacitor 112 is calculated using derivations of the natural log equation discussed above with respect to FIG. 2. During the calibration process, the capacitor 112 is allowed to discharge down from the starting voltage to the threshold voltage through the first resistor 118 and then again through the second resistor 116. FIG. 7B graphically depicts the exponential voltage decay of the capacitor 112 through the first resistor 118. FIG. 7C graphically depicts the exponential voltage decay of the capacitor 112 through the second resistor 116. The discharge times (TMAX1 in FIG. 7B and TMAX2 in FIG. 7C) are measured and stored for later use. The time period required to measure the first discharge time TMAX1 (as depicted in FIG. 7A) is substantially longer as compared to the time period required to measure the second discharge time TMAX2 (as depicted in FIG. 7B). Therefore, a nominal value of the first discharge time is stored in the microprocessor 100 until the actual calibration process is complete. This is done in the event of a power interruption shortly after power is initially supplied to the device. In the case of a cold start power interruption, the microprocessor 100 loads up and uses the nominal value of the first discharge time until the calibration process is complete.

The following is a discussion of how the discharge times are calculated using derivations of the natural log equation discussed above for FIG. 2.

STEP 1: Derive an equation that expresses the time in seconds ($t_1$) it will take for the capacitor to discharge through a first resistor (using time constant $RC_1$) from a starting voltage ($V_{START}$) to a predetermined threshold voltage ($V_{THRESH}$) and call that time $TMAX_1$.

$$V_{THRESH} = V_{START}(e^{-t1/RC1}) \quad (1)$$

$$V_{THRESH}/V_{START} = e^{-t1/RC1} \quad (2)$$

$$ln(V_{THRESH}/V_{START}) = -t_1/RC_1 \quad (3)$$

$$-RC_1 * ln(V_{THRESH}/V_{START}) = t_1 = TMAX_1 \quad (4)$$

STEP 2: Derive an equation that expresses the time in seconds ($t_2$) it will take for the capacitor to discharge through a second resistor (using time constant $RC_2$) from a starting voltage ($V_{START}$) to a predetermined threshold voltage ($V_{THRESH}$) and call that time $TMAX_2$.

$$V_{THRESH} = V_{START}(e^{-t2/RC2}) \quad (5)$$

$$V_{THRESH}/V_{START} = e^{-t2/RC2} \quad (6)$$

$$ln(V_{THRESH}/V_{START}) = -t_2/RC_2 \quad (7)$$

$$-RC_2 * ln(V_{THRESH}/V_{START}) = t_2 = TMAX_2 \quad (8)$$

STEP 3: Derive an equation that expresses the ratio of the two time constants $RC_1$ and $RC_2$ using $TMAX_1$ and $TMAX_2$ and call that ratio K.

Rearrange equation (8) to yield:

$$ln(V_{THRESH}/V_{START}) = -(TMAX_2/RC_2) \quad (9)$$

substitute equation (9) into equation (4) to yield:

$$-RC_1 * -(TMAX_2/RC_2) = TMAX_1 \quad (10)$$

rearrange equation (10) to yield:

$$TMAX_1/TMAX_2 = RC_1/RC_2 = K \quad (11)$$

STEP 4: Derive an equation that expresses the duration of a power interruption ($t_1$) in terms of $TMAX_1$, K and $t_2$ where $t_2$ is the length of time it takes for the capacitor to discharge through the second resistor from the voltage level at which the power interruption ends ($V_{END}$) to a predetermined threshold voltage ($V_{THRESH}$).

$$V_{END} = V_{START}(e^{-t1/RC1}) \quad (12)$$

$$V_{THRESH} = V_{END}(e^{-t2/RC2}) \quad (13)$$

substitute equation (12) into equation (13) to yield:

$$V_{THRESH} = V_{START}(e^{-t1/RC1})(e^{-t2/RC2}) \quad (14)$$

$$e^{-t1/RC1} = V_{THRESH}/V_{START}(e^{t2/RC2}) \quad (15)$$

$$-t_1/RC_1 = ln(V_{THRESH}/V_{START}) + t_2/RC_2 \quad (16)$$

$$t_1 = -[RC_1 * ln(V_{THRESH}/V_{START}) + t_2(RC_1/RC_2)] \quad (17)$$

$$t_1 = -[RC_1 * (-TMAX_1/RC_1)] - (t_2 * K) \quad (18)$$

$$t_1 = TMAX_1 - (t_2 * K) \quad (19)$$

Figure 8:
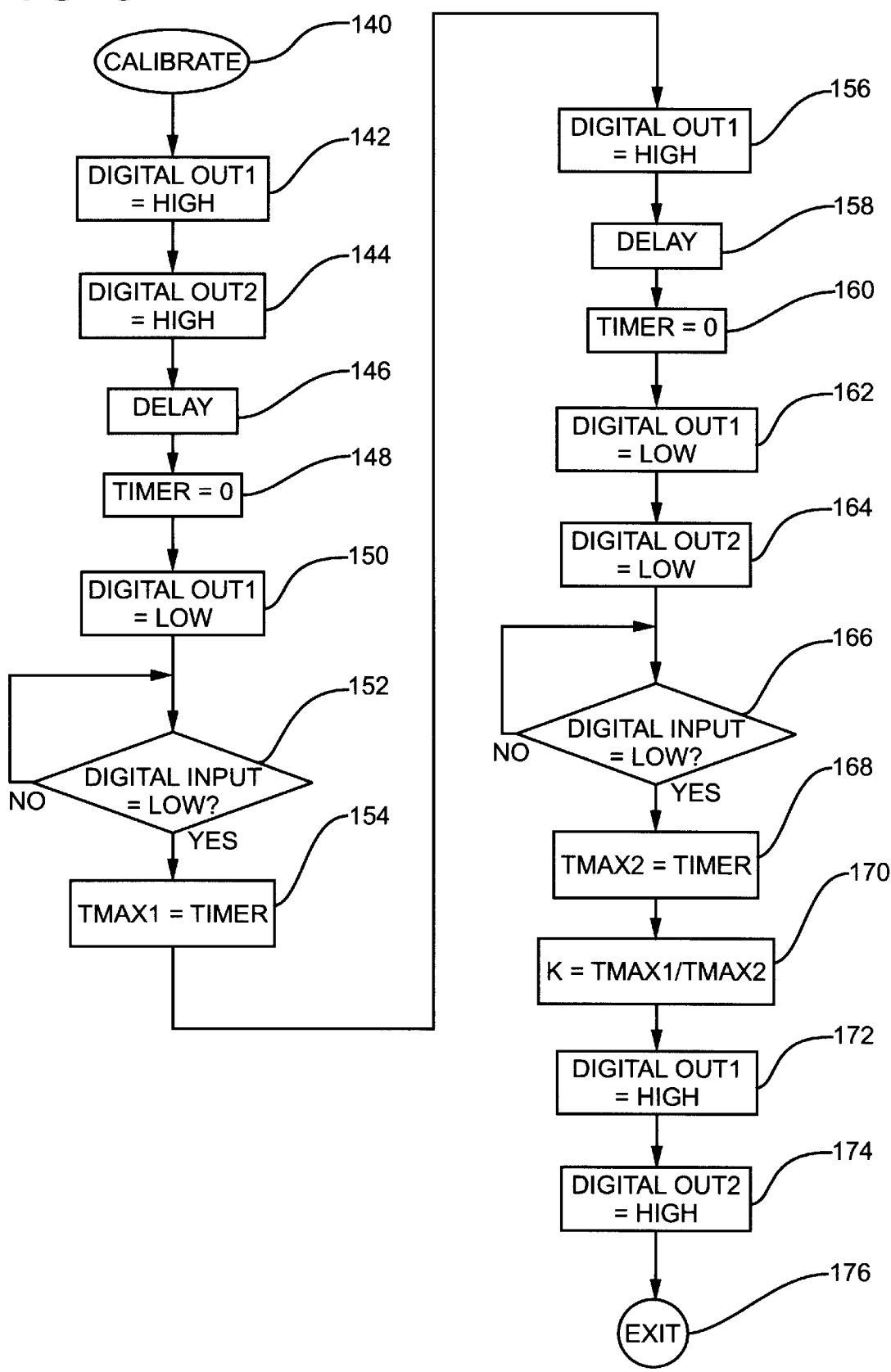
FIG. 8 is a flow diagram showing the calibration procedure method for calibrating the RC circuit in accordance with the second embodiment of the present invention.

FIG. 8 is a flow diagram showing the method used by the microprocessor in the second embodiment to measure the discharge times TMAX1 and TMAX2 and to calculate the variable K (refer to discussion above). As discussed above with respect to FIG. 3, the calibration process enables the use of low cost components with large tolerance values without compromising time keeping accuracy.

Upon starting the calibration process (step 140), the microprocessor 4 sets digital output port 1 and digital output 2 high (steps 142, 144). Next, a delay is instituted to allow the capacitor 112 to charge up (step 146) and a timer is set to 0 (step 148). Digital output port 1 (108) is then set low which allows the capacitor 112 to discharge through the first resistor 118 (step 150). Next, the microprocessor 4 checks to see if the digital input port 104 is set low (step 152). If the digital input port 104 is not low (no in step 152), the capacitor 112 has not yet discharged down to the predetermined threshold voltage. The microprocessor 4 will continue to check the digital input port 104 until it is low. Once the digital input goes low (yes in step 152), the microprocessor 4 reads the timer and stores that value as TMAX1 (step 154). The variable TMAX1 is related to the first time constant. Next, digital output port 1 (108) is set high (step 156) and a delay is instituted to again allow the capacitor 112 to charge up (step 158). The timer is reset to 0 (step 160) and digital output port 1 (108) and digital output port 2 (102) are both set low (steps 162, 164). This allows the capacitor 112 to discharge through the second resistor 116.

Next, the microprocessor 4 checks to see if the digital input port 104 is low (step 166). If the digital input port is not low (no in step 166), the capacitor 112 has not yet discharged down to the predetermined threshold voltage. The microprocessor will continue to check the digital input port until it is low. Once the digital input port goes low (yes in step 166), the microprocessor 4 reads the timer and stores that value as TMAX2 (step 168). The variable TMAX2 is related to the second time constant. Next, the variable K is calculated by taking the ratio of TMAX2 to TMAX1 (step 170). The variable K represents the ratio of the two time constants. TMAX1 and K are used by the microprocessor to calculate the duration of an interruption in the supply of power, should one occur (refer to FIG. 10). Finally, digital output port 1 (108) and digital output port 2 (102) are reset to high (steps 172, 174) and the routine exits (step 176).

Figure 9:
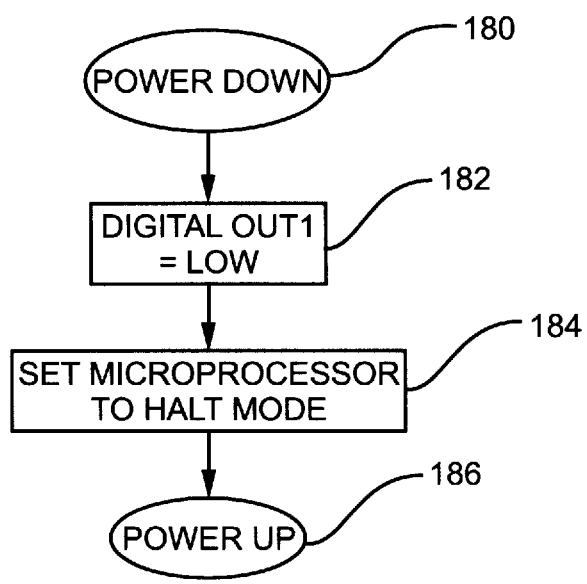
FIG. 9 is a flow diagram showing the power down procedure method for responding to a power interruption in accordance with the second embodiment of the present invention.

FIG. 9 is a flow diagram showing the method used by the microprocessor 4 according to the second embodiment of the invention to respond to a power interruption. After losing power (step 180), the microprocessor 4 sets digital output port 1 (104) low, thus causing the capacitor 112 to discharge (step 182). The microprocessor 4 then enters a halt mode where it draws very little current (step 184). Alternately, power can be removed from the microprocessor, although this may require switching to isolate the microprocessor ports from the RC circuit. Once power is restored, the routine continues and proceeds to the power up routine (step 186).

Figure 10:
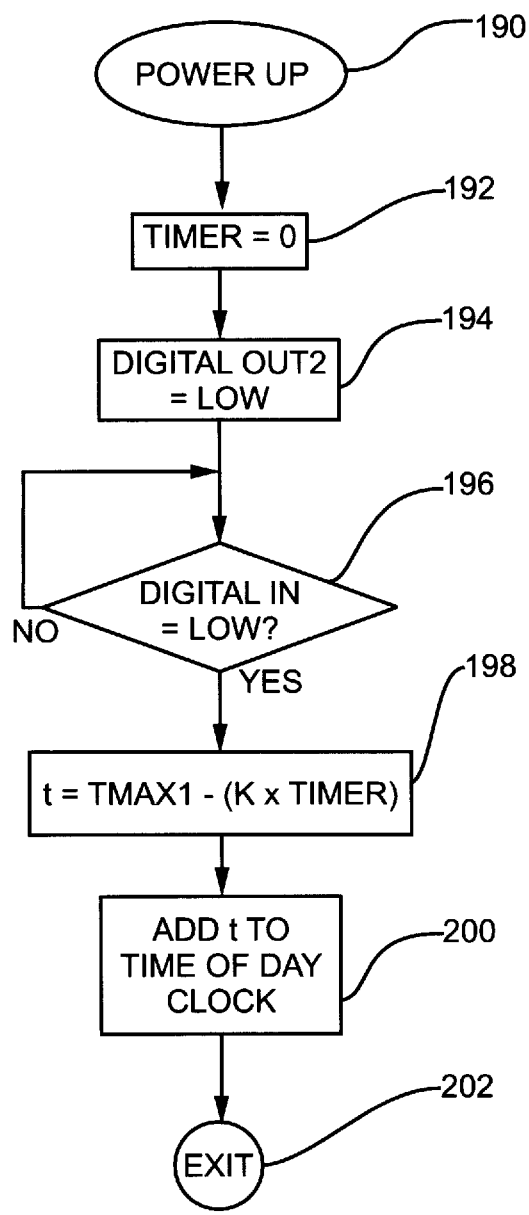
FIG. 10 is a flow diagram showing the power up procedure method for updating a time of day clock after power has been restored in accordance with the second embodiment of the present invention.

FIG. 10 is a flow diagram showing the method used by the microprocessor 4 of the second embodiment of the invention to accurately update the time of day clock 98 when power is restored after an interruption in the supply of power. When the supply of power is restored (step 190), a timer is set to 0 (step 192) and digital output port 2 (102) is set low (step 194). As discussed above with respect to FIGS. 6A and 7A, setting digital output port 2 (102) low allows the capacitor to discharge quickly. Next, the microprocessor continually checks to see if the digital input port is low (step 196). When the digital input port is low (yes in step 196), the microprocessor 4 knows that the capacitor 112 has discharged down to the predetermined threshold voltage. Once the capacitor 112 has discharged down to the threshold voltage, the microprocessor 4 reads the elapsed time on the timer and, in step 198, calculates the duration t of the power interruption by subtracting the product of the elapsed time and the previously determined variable K from TMAX1 (both K and TMAX1 are stored as a result of the calibration procedure described above with respect to FIG. 8). The microprocessor then adds t to the time of day clock (step 200) and the routine exits (step 202).

While in the figures the time of day clock is shown as being in the microprocessor, the time of day clock can be located in the electronic device outside the microprocessor. In this embodiment, suitable electrical connections would be present between the back-up system, microprocessor and the time of day clock.

As a result of the present invention, time keeping accuracy is improved during a power interruption by accounting for component tolerances in the system. The microprocessor accomplishes this during a calibration mode by discharging the capacitor while power is available. By carefully measuring the discharge time while power is available, a more accurate value of the time constant (RC) can be calculated. This enables the system to maintain accuracy while still allowing the use of low cost components with larger value tolerances.

Having described specific preferred embodiments of the invention with reference to the accompanying drawings, it will be appreciated that the present invention is not limited to those specific embodiments, and that various modifications can be effected thereto by one of ordinary skill in the art without departing from the scope or spirit of the invention, as defined in the appended claims.

What is claimed is:

1. A backup system for a time of day clock, the backup system comprising:

a resistor-capacitor circuit having at least a resistor and a capacitor;

charging means coupled to the resistor-capacitor circuit for selectively supplying an electrical charge to the resistor-capacitor circuit and energizing the capacitor; and a controller having an analog/digital converter coupled to the resistor-capacitor circuit, the analog/digital converter being responsive to a voltage level of the resistor-capacitor circuit, the controller determining a time constant of the resistor-capacitor circuit and updating the time of day clock after a power interruption has occurred based on the time constant and a change in voltage of the resistor-capacitor circuit during the power interruption.

2. The backup system according to claim 1 wherein the controller further includes:

means for determining a time constant of the resistor-capacitor circuit; and means for updating the time of day clock after a power interruption has occurred based on the time constant and a change of voltage of the resistor-capacitor circuit during the power interruption.

3. The backup system according to claim 1, wherein the controller further includes:

means for controlling the charging means to charge up the resistor-capacitor circuit to a maximum voltage, the maximum voltage being measured by the analog/digital converter;

means for controlling discharge of the capacitor to a predetermined discharge voltage, the predetermined discharge voltage being measured by the analog/digital converter; means for measuring a discharge time of the capacitor from a charged state to the predetermined discharge voltage; and means for calculating the time constant of the resistor-capacitor circuit based on the maximum voltage, the predetermined discharge voltage and the discharge time.

4. The backup system according to claim 3, wherein the controller further includes:

means for controlling the analog/digital converter to measure a voltage level of the resistor-capacitor circuit at a start of the power interruption;

means for controlling the analog/digital converter to measure a voltage level of the resistor-capacitor circuit at an end of the power interruption;

means for determining the length of time of the power interruption based on the time constant of the resistor-capacitor circuit, the voltage level of the resistor-capacitor circuit at the start of the power interruption and the voltage level of the resistor-capacitor circuit at the end of the power interruption; and means for adding the duration of the power interruption to the time of day clock to update the time of day clock.

5. The backup system according to claim 4, wherein the controller further includes:

means for controlling the charging means to supply a high electrical charge to the capacitor of the resistor-capacitor circuit when electrical power is being supplied; and means for controlling the charging means to not supply an electrical charge to the capacitor of resistor-capacitor circuit during a power interruption thereby allowing the capacitor to discharge and supply the controller with backup power, wherein the controller enters a halt mode.

6. The backup system according to claim 4, wherein the controller further includes:

means for removing power from the controller during a power interruption thereby allowing the capacitor to discharge and supply the controller with backup power, wherein the controller enters a halt mode.

7. The backup system according to claim 1, wherein the time constant of the resistor-capacitor circuit is longer than a duration of most typical power interruptions.

8. The backup system according to claim 1, wherein the resistor and capacitor are connected in parallel.

9. The backup system according to claim 1, wherein the charging means comprises a controller output port and a diode.

10. The backup system according to claim 1, wherein the controller comprises a microprocessor.

11. A backup system for a time of day clock the backup system comprising:

a resistor-capacitor circuit having at least a resistor and a capacitor;

charging means coupled to the resistor-capacitor circuit for selectively supplying an electrical charge to the resistor-capacitor circuit and energizing the capacitor;

a controller having a digital input port coupled to the resistor-capacitor circuit, the digital input port being responsive to a threshold voltage level of the resistor-capacitor circuit, the controller discharging the resistor-capacitor circuit during a power interruption, the controller causing the resistor-capacitor circuit to continue to discharge down to the threshold voltage at an end of the power interruption, the controller measuring the discharge time required to discharge the resistor-capacitor circuit to the threshold voltage after power has been restored, the controller calculating the duration of the power interruption utilizing the resistor-capacitor circuit discharge time, and adding the calculated duration of the power interruption to the time of day clock to update the time of day clock.

12. The backup system according to claim 11 wherein the controller further includes:

means for allowing the resistor-capacitor circuit to discharge during the power interruption;

means for causing the resistor-capacitor circuit to continue to discharge down to a threshold voltage at the end of the power interruption;

means for measuring the time required to discharge the resistor-capacitor circuit to the threshold voltage;

means for calculating the duration of the power interruption based on the measured resistor-capacitor circuit discharge time; and means for adding the calculated duration of the power interruption to the time of day clock.

13. The backup system according to claim 11, further comprising an accelerated discharge means coupled to the resistor-capacitor circuit for accelerating the discharge of the resistor-capacitor circuit.

14. The backup system according to claim 13, wherein the controller further includes:

means for measuring a first discharge time of the resistor-capacitor circuit with the accelerated discharge means disabled;

means for measuring a second discharge time of the resistor-capacitor circuit with the accelerated discharge means enabled; and means for disabling the accelerated discharge means during a power interruption and for enabling the accelerated discharge means immediately after restoration of power;

wherein the means for calculating the length of time of the power interruption includes means for calculating the length of time of the power interruption based on the first discharge time, the second discharge time and the resistor-capacitor circuit discharge time measured immediately after the restoration of power.

15. The backup system according to claim 14, wherein the means for measuring the first discharge time of the resistor-capacitor circuit comprises means for charging the resistor-capacitor circuit up to a maximum value and allowing the resistor-capacitor circuit to discharge, with the accelerated discharge means disabled, until the digital input senses that the resistor-capacitor circuit has discharged down to the threshold voltage.

16. The backup system according to claim 15, wherein the means for measuring the second discharge time of the resistor-capacitor circuit comprises means for charging the resistor-capacitor circuit up to a maximum value and allowing the resistor-capacitor circuit to discharge, with the accelerated discharge means enabled, until the digital input senses that the resistor-capacitor circuit has discharged down to the threshold voltage.

17. The backup system according to claim 14, wherein the means for calculating the length of time of the power interruption includes means for calculating the length of time of the power interruption based on a nominal value of the first discharge time if a power interruption occurs before the means for measuring the first discharge time measures the first discharge time.

18. The backup system according to claim 13, wherein the accelerated discharge means comprises at least one of a controller output port, a diode and a resistor.

19. The backup system according to claim 18, further comprising a second diode coupled between the resistor-capacitor circuit and a ground potential to compensate for any potential errors which might otherwise be caused by a voltage drop of the diode of the accelerated discharge means.

20. The backup system according to claim 19, further comprising a third diode coupled between the resistor-capacitor circuit and a ground potential.

21. The backup system according to claim 20 wherein said second diode and said third diode are electrically coupled in parallel.

22. The backup system according to claim 21, said second and third diodes each respectively having an anode and a cathode, wherein the anode of the second diode is electrically coupled to the cathode of the third diode, and wherein the cathode of the second diode is electrically coupled to the anode of the third diode.

23. The backup system according to claim 11, wherein the resistor and capacitor are connected in parallel.

24. The backup system according to claim 11, wherein the charging means comprises a controller output port and a diode.

25. The backup system according to claim 11, wherein the controller further includes:

means for controlling the charging means to supply a high electrical charge to the resistor-capacitor circuit when electrical power is being supplied; and means for controlling the charging means to not supply an electrical charge to the resistor-capacitor circuit during a power interruption thereby allowing the resistor-capacitor circuit to discharge and supply the controller with backup power, wherein the controller enters a halt mode.

26. The backup system according to claim 11, wherein the controller further includes means for removing power from the controller during a power interruption thereby allowing the capacitor to discharge and supply the controller with backup power, wherein the controller enters a halt mode.

27. The backup system according to claim 11, wherein the controller comprises a microprocessor.

28. A method of backing up a time of day clock, the method comprising the steps of:

charging a resistor-capacitor circuit to a selected voltage;

allowing the capacitor to discharge down to a predetermined voltage;

measuring a discharge time of the capacitor;

determining a time constant of the resistor-capacitor circuit by using the discharge time and selected and predetermined voltage measurements; and updating the time of a day clock as a function of the determined time constant after a power interruption has occurred.

29. The method of claim 28, further comprising the steps of:

determining the duration of time of the power interruption by utilizing the calculated time constant and a measured change in voltage of the resistor-capacitor circuit during the power interruption; and adding the duration of the time of the power interruption to the time of the time of day clock.

30. A method of providing a backup system for a time of day clock in an electrical device, the method comprising the steps of:

charging a resistor-capacitor circuit with an electrical charge;

permitting an interruption in a supply of electric power to the electronic device;

discharging the resistor-capacitor circuit during the power interruption;

determining when the interruption in the supply of power to the electronic device has ended;

continuing the discharge of the resistor-capacitor circuit after the power interruption has ended;

measuring the time required to substantially drain the resistor-capacitor circuit to a predetermined value from the end of the power interruption;

determining the duration of the power interruption using the time required to substantially drain the resistor-capacitor circuit to the predetermined value; and providing the duration of the power interruption to the time of day clock to correct the time of the time of day clock.

31. A method of providing a backup system for a time of day clock in an electronic device, comprising the steps of:

charging a resistor-capacitor circuit with an electrical charge;

measuring a first discharge time of the resistor-capacitor circuit without the use of an accelerated discharge means prior to power interruption;

measuring a second discharge time of the resistor-capacitor circuit using an accelerated discharge means prior to power interruption;

permitting an interruption in a supply of power;

permitting the resistor-capacitor circuit to discharge without the use of the accelerated discharge means during the power interruption;

permitting a resumption of the supply of power;

substantially immediately after resumption of the supply of power, allowing the resistor-capacitor circuit to continue to discharge with the accelerated discharge means enabled;

measuring the time required to substantially completely discharge the resistor-capacitor circuit from the point of resumption of the supply of power;

calculating the length of time of the power interruption by utilizing the time required to substantially completely discharge the resistor-capacitor circuit; and adding the calculated length of time of the power interruption to the time of the time of day clock.

32. The method of claim 31, further comprising the steps of:

measuring the first discharge time of the resistor-capacitor circuit by charging the resistor-capacitor circuit up to a maximum value, and allowing the resistor-capacitor circuit to discharge with the accelerated discharging means disabled.

33. The method of claim 32, further comprising the steps of:

measuring the second discharge time of the resistor-capacitor circuit by charging the resistor-capacitor circuit up to a maximum value, and allowing the resistor-capacitor circuit to discharge with the accelerated discharging means enabled.

* * * * *